US011246113B2

(12) United States Patent
Koudouridis et al.

(10) Patent No.: US 11,246,113 B2
(45) Date of Patent: Feb. 8, 2022

(54) NETWORK ACCESS NODE AND METHODS THEREOF

(71) Applicant: Huawei Technologies Co., Ltd., Shenzhen (CN)

(72) Inventors: George Koudouridis, Kista (SE); Johan Christer Qvarfordt, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/863,957

(22) Filed: Apr. 30, 2020

(65) Prior Publication Data

US 2020/0260405 A1  Aug. 13, 2020

Related U.S. Application Data

(63) Continuation of application No. PCT/EP2017/077767, filed on Oct. 30, 2017.

(51) Int. Cl.
*H04W 4/00* (2018.01)
*H04W 64/00* (2009.01)
(Continued)

(52) U.S. Cl.
CPC ........ *H04W 64/003* (2013.01); *H04B 17/309* (2015.01); *H04W 4/02* (2013.01);
(Continued)

(58) Field of Classification Search
CPC ..... H04W 64/003; H04W 4/02; H04W 24/10; H04W 48/16; H04B 17/309
See application file for complete search history.

(56) References Cited

U.S. PATENT DOCUMENTS 6,985,731 B1    1/2006 Johnson et al.
2004/0203880 A1  10/2004 Riley
(Continued)

FOREIGN PATENT DOCUMENTS

CN    100461932 C    2/2009
CN    102714857 A   10/2012
CN    105934977 A    9/2016

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description;Stage 2 (Release 13)," 3GPP TS 37.320 V13.1.0, pp. 1-26, 3rd Generation Partnership Project, Valbonne, France (Mar. 2010).
(Continued)

*Primary Examiner* — Erika A Washington
(74) *Attorney, Agent, or Firm* — Leydig, Voit & Mayer, Ltd.

(57) ABSTRACT

A first network access node for a wireless communication system obtains a set of first radio service information (RSI) for a set of first position information in a service area. Each first RSI of the set of first RSI comprises a first RSI estimate, a first estimate type indicating how the first RSI estimate was estimated, and a first radio service type defining the first RSI estimate. The first network access node further receives a first control message from a second network access node. Corresponding methods and computer program products are also described.

16 Claims, 4 Drawing Sheets

(51) Int. Cl.
    *H04B 17/309* (2015.01)
    *H04W 4/02* (2018.01)
    *H04W 24/02* (2009.01)
    *H04W 24/10* (2009.01)
    *H04W 48/16* (2009.01)

(52) U.S. Cl.
    CPC ........... *H04W 24/02* (2013.01); *H04W 24/10* (2013.01); *H04W 48/16* (2013.01)

(56) References Cited

U.S. PATENT DOCUMENTS

| | | |
|---|---|---|
| 2005/0261004 A1 | 11/2005 | Dietrich et al. |
| 2006/0227744 A1 | 10/2006 | Metke et al. |
| 2012/0190380 A1 | 7/2012 | Dupray et al. |
| 2013/0109405 A1 | 5/2013 | Siomina et al. |
| 2013/0310077 A1 | 11/2013 | Siomina et al. |
| 2015/0319614 A1* | 11/2015 | Cho ................ H04W 4/02 726/7 |
| 2017/0078941 A1 | 3/2017 | Zhang et al. |
| 2017/0188227 A1* | 6/2017 | Kang ................ G01S 5/0252 |

OTHER PUBLICATIONS

Bourke, "Nearest neighbour weighted interpolation," pp. 1-3, Published Online, paulburke.net (Dec. 1999).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0, pp. 1-149, 3rd Generation Partnership Project, Valbonne, France (Mar. 2010).

"3rd Generation Partnership Project;Technical Specification Group Radio Access Network; Evolved Universal Terrestrial Radio Access (E-UTRA); Radio Resource Control (RRC); Protocol specification (Release 12)," 3GPP TS 36.331 V12.15.1, pp. 1-459, 3rd Generation Partnership Project, Valbonne, France (Sep. 2017).

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description;Stage 2 (Release 13)," 3GPP TS 37.320 V13.1.0, pp. 1-26, 3rd Generation Partnership Project, Valbonne, France Mar. 2016.

Li et al., "A Review of Spatial Interpolation Methods for Environmental Scientists," Record 2008/23, GeoCat #68229, pp. 1-154, Geoscience Australia, Canberra, Australia (2008).

Shepard, "A two-dimensional interpolation for irregularly-spaced data function," Proceedings of 1968 ACM National Conference, pp. 517-524, Harvard College Cambridge, Massachusetts (Jan. 1968).

Benedetto et al., "Dynamic LOS/NLOS Statistical Discrimination of Wireless Mobile Channels," Proceedings of IEEE VTC Spring, pp. 3071-3075, Institute of Electrical and Electronics Engineers, New York, New York (Apr. 22-25, 2007).

Bourke, "Nearest neighbour weighted interpolation," pp. 1-3, Published Online, paulburke.net Apr. 1998.

Werner et al., "Performance and Cramer-Rao Bounds for DoA/RSS Estimation and Transmitter Localization Using Sectorized Antennas," IEEE Transactions on Vehicular Technology, vol. 65, No. 5, pp. 3255-3270, Institute of Electrical and Electronics Engineers, New York, New York (May 2016).

* cited by examiner

| First RSI estimate | First estimate type | First radio service type | First estimate uncertainty | First time stamp |

Fig. 5 a)

| Second RSI estimate | Second estimate type | Second radio service type | Second estimate uncertainty | Second time stamp |

NETWORK ACCESS NODE AND METHODS THEREOF

CROSS-REFERENCE TO RELATED APPLICATIONS

This application is a continuation of International Application No. PCT/EP2017/077767, filed on Oct. 30, 2017, the disclosure of which is hereby incorporated by reference in its entirety.

TECHNICAL FIELD

The disclosure relates to a network access node. Furthermore, the disclosure also relates to corresponding methods and a computer program.

BACKGROUND

Two of the objectives with the specification of 4G in the 3GPP standardization work were to achieve management simplicity and operational cost efficiency. These objectives have been defined in terms of requirements on Self-Organizing Networks (SON) as specified in a number of use cases. 3GPP specifies the operation of a number of SON use cases, and the first one to become well-defined is the automation of neighbour relations. The concept of neighbours and neighbour cells implies that every network access node (in a radio access network) maintains an entry in a neighbour relation table for each one cell of its neighbour network access nodes. Broadly, SON comprises a framework for all self-configuration, self-optimization, and self-healing processes consisting of several different functions from evolved nodeB (eNB) activation to radio parameter tuning.

A self-configuration process is defined as the process where newly deployed nodes are configured by automatic installation procedures to get the necessary basic configuration for system operation. This process works in pre-operational state. Pre-operational state is understood as the state from when the eNB is powered up and has backbone connectivity until the radio frequency (RF) transmitter is switched on. One of the key functions of the self-configuration process handled in the pre-operational state is the initial radio configuration of a network access node.

Self-optimization process is defined as the process where user equipment (UE) and eNB measurements and performance measurements are used to auto-tune the network. This process works in operational state which is the state where the RF interface is additionally switched on. The functions of the self-optimization process, which are handled in the operational state, aims at optimizing and/or adapting to the radio environment.

SUMMARY

Embodiments of the invention provide solutions that mitigate or solve the drawbacks and problems of conventional solutions.

According to a first aspect, the above mentioned and other objectives are achieved with a first network access node for a wireless communication system, the first network access node being configured to obtain a set of first radio service information (RSI) for a set of first position information in a service area, wherein each first RSI of the set of first RSI comprises a first RSI estimate, a first estimate type indicating how the first RSI estimate was estimated, and a first radio service type defining the first RSI estimate; receive a first control message from a second network access node, wherein the first control message comprises a set of second RSI for a set of second position information in the service area, wherein each second RSI of the set of second RSI comprises a second RSI estimate, a second estimate type indicating how the second estimate was estimated, and a second radio service type defining the second RSI estimate; determine a coverage service map based on the set of first RSI, the set of first position information, the set of second RSI, and the set of second position information.

Position information in this disclosure should be understood to mean a representation of a physical spatial location where a client device, such as a first client device and/or a second client device, may (be expected to) appear in a service area.

Service area in this disclosure can be understood to mean a defined space wherein at least one network access node in the system is expecting to provide service coverage to client devices.

A first network access node according to the first aspect provides a number of advantages over conventional solutions. An advantage of the first network access node is that it enables the first network access node to receive information from a second network access node about radio service information for a set of second positions in the service area. By means of the first and the second estimate types the first network access node can determine at least one of regions of the service area where the first estimate type of the first RSI indicates that it is based on more measurements than the second estimate type of the second RSI. This region of the service area is referred to as region I; regions of the service area where the first estimate type of the first RSI indicates that it is based on fewer measurements than the second estimate type of the second RSI. This region of the service area is referred to as region II; regions of the service area where the first estimate type of the first RSI indicates that it is based on an equivalent amount of measurements than the second estimate type of the second RSI. This region of the service area is referred to as region III.

The coverage service map of the first network access node is determined by a weighted comparison of the first RSI estimate and second RSI estimate, wherein the weight is a function of the regions.

The determination of the regions I, II and III will in the following disclosure be denoted region determination.

In an implementation form of a first network access node according to the first aspect, the first network access node is further configured to obtain a set of first radio signal information for the service area; determine a set of first path-loss estimates for the set of first position information based on the set of first radio signal information; determine a set of first interpolation based estimates for the set of first position information based on the set of first radio signal information; obtain the set of first RSI for the set of first position information by determining the set of first RSI based on a weighted aggregation of the set of first path-loss estimates and the set of first interpolation based estimates.

An advantage with this implementation form is that it enables the first network access node to determine the RSI in the set of positions in the service area by combining different estimation methods. The weighted combination of different methods is used to improve the estimation of the RSI by diminishing the effect of the bias of each method proportionally to the weights.

In an implementation form of a first network access node according to the first aspect, the first network access node is further configured to determine the set of first RSI based at least one of: a weighted sum of the set of first path-loss estimates and the set of first interpolation based estimates; a maximum aggregation of the set of first path-loss estimates and the set of first interpolation based estimates; a minimum aggregation of the set of first path-loss estimates and the set of first interpolation based estimates; and a priority aggregation of the set of first path-loss estimates and the set of first interpolation based estimates based on priorities associated to line-of-sight or no line-of-sight.

An advantage with this implementation form is that it enables the first network access node to determine the most appropriate weighted combination of different methods. For instance, for regions with very few radio signal information the path-loss estimate may be weighted higher, which in regions with more radio signal information the path-loss estimate may be weighted lower.

In an implementation form of a first network access node according to the first aspect, the first network access node is further configured to determine a subset of the set of first RSI for a subset of the set of first position information based on a service threshold value; limit the subset of the set of first RSI based on a comparison of the subset of the set of first RSI and the set of second RSI at the intersection of the subset of the set of first position information and the set of second position information; determine the coverage service map based on the limited subset of the set of first RSI.

An advantage with this implementation form is that it enables the first network access node to limit the coverage service map to only contain the set of first RSI for the first position information where the first RSI meets a service threshold value associated with a service. The threshold value defines the requirement for supporting a specific service with quality of service targets. It further enables the first network access node to limit the storage size and memory consumption for storing position information which is limited to position information of the coverage service map.

In an implementation form of a first network access node according to the first aspect, the first network access node is further configured to limit the subset of the set of first RSI based on a comparison of first estimate types of the subset of the set of first RSI and second estimate type of the set of second RSI at the intersection of the subset of the set of first position information and the set of second position information.

An advantage with this implementation form is that it enables the first network access node to further limit the coverage service map to only contain the set of first RSI for the first position information where the first RSI is superior to the second RSI for the second position information. The comparison relation, determining the superiority, is defined based on the specific service with the specific quality of service targets. It further enables the first network access node to limit the storage size and memory consumption for storing position information which is limited to position information of the coverage service map.

In an implementation form of a first network access node according to the first aspect, the first estimate type indicates any of:

a) estimated by the first network access node based on a set of first radio signal information from a set of first client devices in the service area, wherein the size of the set of first radio signal information is higher than a first upper threshold value;

b) predicted by the first network access node based on a set of first radio signal information from a set of first client devices in the service area, wherein the size of the set of first radio signal information is lower than a first lower threshold value; and c) measured by the first network access node based on a set of first radio signal information from a set of first client devices in the service area, wherein the size of the set of first radio signal information is lower than the first upper threshold value and higher than the first lower threshold value.

An advantage with this implementation form is that it enables the first network access node to exchange information about the estimate type for a first RSI for a first position information with other network access nodes which in a subsequent step enables the determination of regions.

In an implementation form of a first network access node according to the first aspect, the second estimate type indicates any of:

d) estimated by the second network access node based on a set of second radio signal information from a set of second client devices in the service area, wherein the size of the set of second radio signal information is higher than a second upper threshold value;

e) predicted by the second network access node based on a set of first radio signal information from a set of second client devices in the service area, wherein the size of the set of second radio signal information is lower than a second lower threshold value; and f) measured by the second network access node based on a set of first radio signal information from a set of second client devices in the service area, wherein the size of the set of second radio signal information is lower than the second upper threshold value and higher than the second lower threshold value.

An advantage with this implementation form is that it enables the first network access node to receive information about the estimate type for a second RSI for a second position information from other network access nodes which in a subsequent step enables the determination of regions.

In an implementation form of a first network access node according to the first aspect, each first RSI further comprises a first estimate uncertainty indicating a measure of spread of the first RSI estimate; each second RSI further comprises a second estimate uncertainty indicating a measure of spread of the second RSI estimate.

An advantage with this implementation form is that it enables the first network access node to refine the comparison relation, determining the superiority between the first RSI and the second RSI, to include the first estimate uncertainty in combination with the first RSI estimate and the second estimate uncertainty in combination with the second RSI estimate. In one example, the superiority of a comparison of two RSIs with equivalent RSI estimates is given by the RSI with the lowest estimate uncertainty.

In an implementation form of a first network access node according to the first aspect, each first RSI further comprises a first timestamp indicating a first time period when the first RSI is valid; each second RSI further comprises a second timestamp indicating a second time period when the second RSI is valid.

An advantage with this implementation form is that it enables the first network access node to determine the distribution of the first RSI estimates for a set of first position information at different time periods throughout a day. The first timestamp can indicate the time periods for the first RSI estimates where fewer or more measurements has been obtained by the first network access node. The time periods can be determined by the first network access node based on a classification of cluster density of measurements over time. The second timestamp can indicate the time periods for the second RSI estimates where fewer or more measurements has been obtained by the second network access node. The time periods can be determined by the second network access node based on a classification of cluster density of measurements over time. This allows for the maintenance of different instances of RSI to be shared with other network access nodes and compared for different time periods.

In an implementation form of a first network access node according to the first aspect, the first network access node is further configured to generate a second control message comprising a request for a set of second RSI for the set of second position information; transmit the second control message to the second network access node; receive the first control message comprising the set of second RSI for the set of second position information in response to the transmission of the second control message.

An advantage with this implementation form is that it allows the first network access node to request RSI from a second network access node. In one example, this is beneficial when a new network access node requests RSI from an existing network access node to determine its coverage service map. The new network access node can in one case been added to the network and in another case been activated or re-activated in the network.

In an implementation form of a first network access node according to the first aspect, the first network access node is further configured to determine a second RSI threshold value associated with the set of second RSI for the set of second position information; transmit the second control message to the second network access node, wherein the second control message further comprises the second RSI threshold value.

An advantage with this implementation form is that it allows the first network access node to request RSI for the set of second position information from a second network access node being superior to a second RSI threshold value. This reduces the second control message size to only contain the second RSI threshold and the first control message size only containing the set of second RSI being superior to the second RSI threshold value.

In an implementation form of a first network access node according to the first aspect, the second control message further comprises a request for an identity of a third network access node having a set of additional second RSI for the set of second position information.

An advantage with this implementation form is that it allows the first network access node to discover a third network access node which has RSI for a position information. This is beneficial to build knowledge about which other network access node other that the second network access node may cover the set of second position information.

In an implementation form of a first network access node according to the first aspect, the first control message further comprises an identity of a third network access node and the first network access node is further configured to transmit an additional second control message to the third network access node using the identity of the third network access node, wherein the additional second control message comprises a request for a set of additional second RSI for the set of second position information; receive an additional first control message from the third network access node, wherein the additional first control message comprises the set of additional second RSI for the set of second position information.

An advantage with this implementation form is that it allows the first network access node to obtain RSI from a third network access node. In one example, this is beneficial when the second network access node is deactivated for power saving reasons. In this case, the first network access node can redefine its coverage service map based on a comparison of the first RSI with the third RSI on the second position information.

In an implementation form of a first network access node according to the first aspect, the first network access node is further configured to receive a third control message from the second network access node; wherein the third control message comprises a request for the set of first RSI for the set of first position information; generate a fourth control message comprising the set of first RSI for the set of first position information; transmit the fourth control message to the second network access node in response to the reception of the third control message.

An advantage with this implementation form is that it allows the first network access node to share first RSI for a set of first position information with another network access node. In one example, this is beneficial when the new network access node issues the request in order to determine its coverage service map.

In an implementation form of a first network access node according to the first aspect, the third control message further comprises a first RSI threshold value associated with the set of first RSI for the set of first position information and the first network access node is further configured to generate the fourth control message comprising the set of first RSI for the set of first position information based on the first RSI threshold value.

An advantage with this implementation form is that it allows the first network access node to share RSI for the set of first position information with a second network access node being superior to a first RSI threshold value. This reduces the third control message size to only contain the first RSI threshold and the fourth control message size only containing the set of first RSI being superior to the first RSI threshold value.

In an implementation form of a first network access node according to the first aspect, the first network access node is further configured to receive a fifth control message from the second network access node, wherein the fifth control message indicates a change in power operation mode of the second network access node; determine an updated coverage service map based on the fifth control message.

An advantage with this implementation form is that it allows first network access node to identify the power operation mode of another network access node and the resulting new network power operation mode, and to determine the coverage service map that best fits to this new network power operation mode.

In an implementation form of a first network access node according to the first aspect, the first network access node is further configured to allocate radio resources in the service area based on the coverage service map.

An advantage with this implementation form is that it enables the first network access node to determine the coverage service map of a service given the obtained RSI in each position of the service area. The generated coverage service map further allows for estimating the radio resources required for the each position in the map.

According to a second aspect, the above mentioned and other objectives are achieved with a method for a first network access node, the method comprises obtaining a set of first radio service information, RSI, for a set of first position information in a service area, wherein each first RSI of the set of first RSI comprises a first RSI estimate, a first estimate type indicating how the first RSI estimate was estimated, and a first radio service type defining the first RSI estimate; receiving a first control message from a second network access node, wherein the first control message comprises a set of second RSI for a set of second position information in the service area, wherein each second RSI of the set of second RSI comprises a second RSI estimate, a second estimate type indicating how the second estimate was estimated, and a second radio service type defining the second RSI estimate; determining a coverage service map based on the set of first RSI, the set of first position information, the set of second RSI, and the set of second position information.

The method according to the second aspect can be extended into implementation forms corresponding to the implementation forms of the first network access node according to the first aspect. Hence, an implementation form of the method comprises the feature(s) of the corresponding implementation form of the first network access node.

The advantages of the methods according to the second aspect are the same as those for the corresponding implementation forms of the first network access node according to the first aspect.

The disclosure also relates to a computer program, characterized in code means, which when run by processing means causes said processing means to execute any method according to the present disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages will be apparent from the following detailed description.

BRIEF DESCRIPTION OF DRAWINGS

The appended drawings are intended to clarify and explain different embodiments, in which:

FIG. 5 a) and FIG. 5 b) shows information elements of the first RSI and the second RSI, respectively, according to an embodiment.

DESCRIPTION OF EMBODIMENTS

Figure 1:
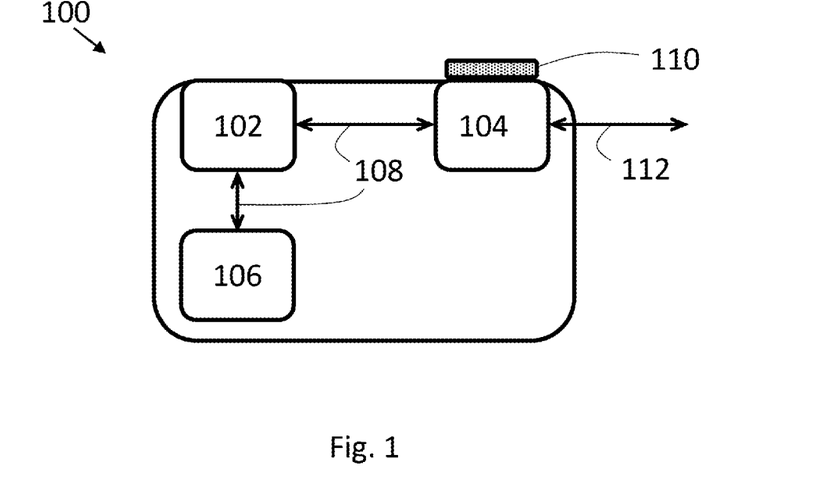
FIG. 1 shows a first network access node according to an embodiment.

FIG. 1 shows a first network access node 100 according to an embodiment. In the embodiment shown in FIG. 1, the first network access node 100 comprises a processor 102, a transceiver 104 and a memory 106. The processor 102 is coupled to the transceiver 104 and the memory 106 by communication means 108 known in the art. The first network access node 100 may be configured for both wireless and wired communications in wireless and wired communication systems, respectively. The wireless communication capability is provided with an antenna 110 coupled to the transceiver 104, while the wired communication capability is provided with a wired communication interface 112 coupled to the transceiver 104.

That the first network access node 100 is configured to perform certain actions should in this disclosure be understood to mean that the first network node 100 comprises suitable means, such as e.g. the processor 102 and the transceiver 104, configured to perform said actions.

Figure 3:
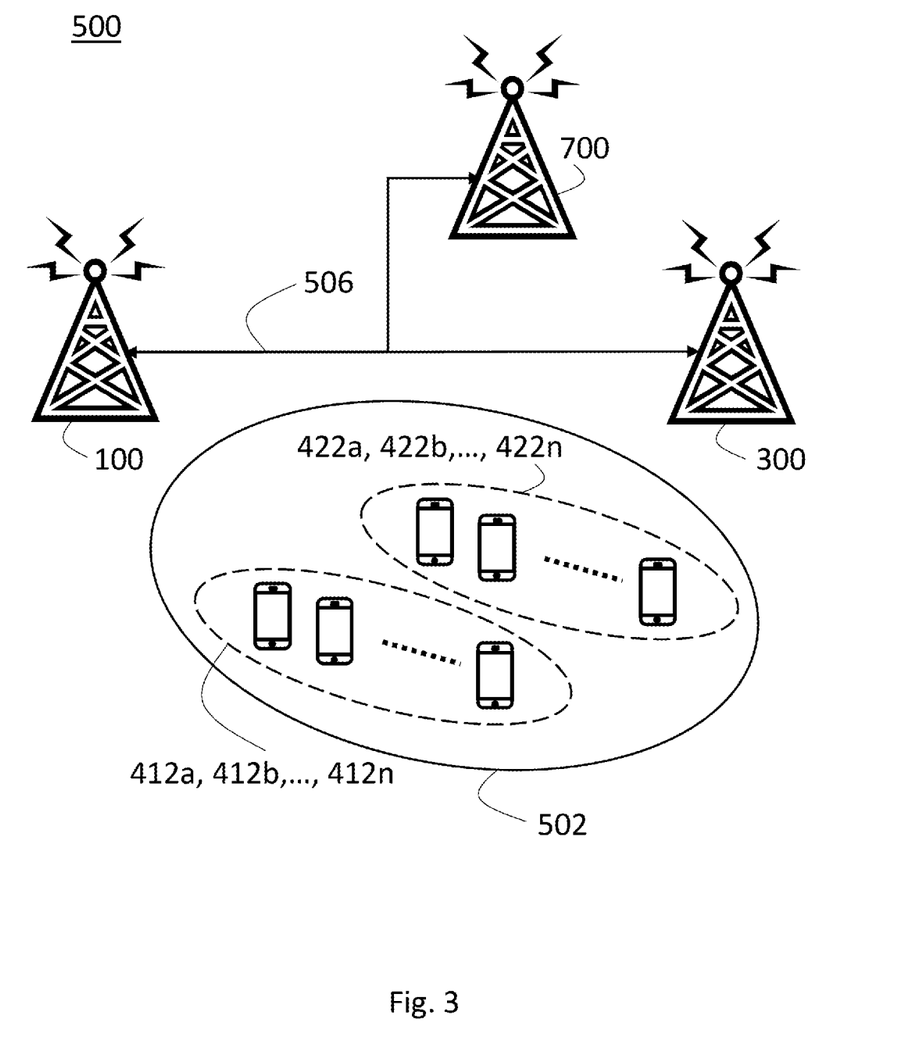
FIG. 3 shows a wireless communication system according to an embodiment.

The first network access node 100 is configured to obtain a set of first radio service information (RSI) for a set of first position information in a service area 502 (shown in FIG. 3). Each first RSI of the set of first RSI comprises a first RSI estimate, a first estimate type indicating how the first RSI estimate was estimated, and a first radio service type defining the first RSI estimate. The first network access node 100 is further configured to receive a first control message 602 (shown in FIG. 4) from a second network access node 300 (shown in FIG. 3). The first control message 602 comprises a set of second RSI for a set of second position information in the service area 502. Each second RSI of the set of second RSI comprises a second RSI estimate, a second estimate type indicating how the second estimate was estimated, and a second radio service type defining the second RSI estimate. Furthermore, the first network access node 100 is configured to determine a coverage service map based on the set of first RSI, the set of first position information, the set of second RSI, and the set of second position information. Based on the determined coverage service map, the first network access node 100 may allocate radio resources in the service area 502. The determined coverage service map can further be used to determine handover border areas, identifying areas where the responsibility for serving a client device is expected to be moved between two network access nodes. The coverage service map can also be used to predict new handover areas in case of de-activation of a network access node for power saving purposes or due to network access node failure. The coverage service map can additionally be used to derive an expected area for a specific service fulfilling a quality of service requirement.

Figure 2:
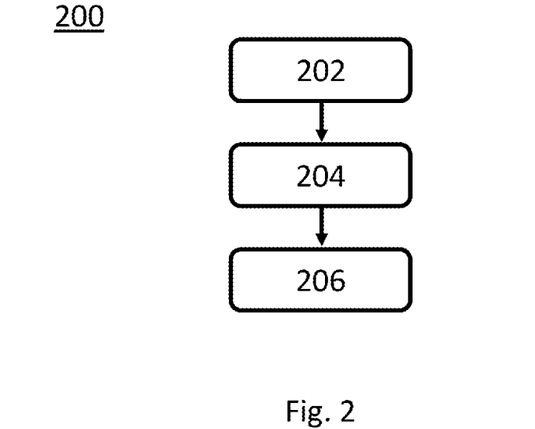
FIG. 2 shows a method according to an embodiment.

FIG. 2 shows a flow chart of a corresponding method 200 which may be executed in a first network access node 100, such as the one shown in FIG. 1. The method 200 comprises obtaining 202 a set of first RSI for a set of first position information in a service area 502. Each first RSI of the set of first RSI comprises a first RSI estimate, a first estimate type indicating how the first RSI estimate was estimated, and a first radio service type defining the first RSI estimate. The method 200 further comprises receiving 204 a first control message 602 from a second network access node 300. The first control message 602 comprises a set of second RSI for a set of second position information in the service area 502. Each second RSI of the set of second RSI comprises a second RSI estimate, a second estimate type indicating how the second estimate was estimated, and a second radio service type defining the second RSI estimate. Furthermore, the method 200 comprises determining 206 a coverage service map based on the set of first RSI, the set of first position information, the set of second RSI, and the set of second position information.

FIG. 3 shows a wireless communication system 500 according to an embodiment. The wireless communication system 500 comprises a first network access node 100, second network access node 300 and a third network access node 700 configured to operate in the wireless communication system 500. The network access nodes 100, 300, 700 are coupled to each other with communication means 506 known in the art. Communication means 506 may e.g. be a backbone transmission network connecting the network access nodes 100, 300, 700. For simplicity, the wireless communication system 500 shown in FIG. 3 only comprises one first network access node 100, one second network access node 300, and one third network access node 700. However, the wireless communication system 500 may comprise any number of first network access nodes 100, any number of second network access nodes 300, and any number of third network access nodes 700.

The wireless communication system 500 shown in FIG. 3 further comprises a number of client devices. A set of first client devices 412a, 412b, . . . , 412n located in the service area 502 and a set of second client devices 422a, 422b, . . . , 422n also located in the service area 502. The service area 502 corresponds to a three-dimensional space wherein at least one of the first network access node 100, the second network access node 300, and the third network access node 700 is expected to provide service coverage. Hence, the first network access node 100 may provide service to the set of first client devices 412a, 412b, . . . , 412n and the set of second client devices 422a, 422b, . . . , 422n in the service area 502. Furthermore, the first network access node 100 may obtain sets of RSI from the set of first client devices 412a, 412b, . . . , 412n and the set of second client devices 422a, 422b, . . . , 422n in the service area 502.

According to embodiments, the first network access node 100 may use the following method to obtain a set of first RSI. In a first step, the first network access node 100 obtains a set of first radio signal information for the service area 502. The radio signal information may be represented by radio service indicators, such as e.g. RSS, RSRP, RSRQ, SNR, BLER/BER, CSI, CQI, or any other service related indicator characterizing the service performance. Thus, the radio signal information for a position may be obtained based on radio signal measurement of the above mentioned radio service indicators by a client device at that position. Based on the set of first radio signal information, the first network access node 100 determines a set of first path-loss estimates for the set of first position information, as well as determines a set of first interpolation based estimates for the set of first position information. The first network access node 100 further obtain the set of first RSI for the set of first position information by determining the set of first RSI based on a weighted aggregation of the set of first path-loss estimates and the set of first interpolation based estimates.

The determining of a first RSI for a position information may be performed according to at least one of the following methods:

A weighted sum of the first path-loss estimate for the position information and the first interpolation based estimate for the position information wherein weights are determined based on a priority of the path-loss estimation and interpolation based estimation methods;

A weighted sum of the first path-loss estimate for the position information and the first interpolation based estimate for the position information, wherein weights are determined based on the position distance between the first network access node 100 and each position information in the set of combined position information and its associated priority to the path-loss estimation and interpolation based estimation methods;

A weighted sum of the first path-loss estimate for the position information and the first interpolation based estimate for the position information wherein weights are determined based on the estimate uncertainty of the path-loss estimate for the position information, on the estimate uncertainty of the interpolation based estimate for the position information, and its associated priority to the path-loss estimation and interpolation based estimation methods;

A priority aggregation of the set of first path-loss estimates and the set of first interpolation based estimates based on priorities associated to line of sight (LOS) or no line of sight (NLOS);

A maximum aggregation of the set of first path-loss estimates and the set of first interpolation based estimates; and A minimum aggregation of the set of first path-loss estimates and the set of first interpolation based estimates.

For example, the following combination approaches can be envisaged for deriving an RSI estimate P for a position (x, y, z) (in this example given in Cartesian coordinates):

weighted-sum given by $P=w_{PL}P_{PL}+w_{IM}P_{IM}$, with $w_{PL}$ and $w_{IM}$ fixed for all positions, weighted-sum given by the distance of a position (x, y, z) from the position of the first network access node ($x_0$, $y_0$, $z_0$) given by $d=\sqrt{(x-x_0)^2+(y-y_0)^2+(z-z_0)^2}$ for instance in one example more distant positions that a distance of $d_0$ may weight interpolation-based estimate higher than path-loss estimate as follows:

$$P = \begin{cases} w_{PL0}P_{PL} + w_{IM0}P_{IM} & \text{if } d \leq d_0 \\ w_{PL1}P_{PL} + w_{IM1}P_{IM} & \text{if } d > d_0 \end{cases}$$

weighted-sum given by the estimate uncertainty (see the following disclosure for definitions of estimate uncertainty), for instance in one example assuming that an estimate uncertainty $u_{PL}$ of a path-loss based RSI estimate for a position information that is higher than an estimate uncertainty $u_{IM}$ of an interpolation based RSI estimate for that position information, then the weight of the interpolation based RSI estimate $w_{IM}=w_{IM2}$ may be higher than the weight of the path-loss based RSI estimate $w_{PL}=w_{PL1}$, i.e., $w_{PL1}<w_{IM2}$, and vice versa, i.e., $w_{IM}=w_{IM1}$, $w_{PL}=w_{PL2}$, and $w_{PL2}>w_{IM1}$ $$P = \begin{cases} w_{PL1}P_{PL} + w_{IM2}P_{IM} & \text{if } u_{PL} > u_{IM} \\ w_{PL2}P_{PL} + w_{IM1}P_{IM} & \text{if } u_{PL} \leq u_{IM} \end{cases}$$

LOS and/or NLOS priority aggregation where, $$P = \begin{cases} P_{PL} & \text{if } \langle x, y, z \rangle \text{ is } LOS \text{ position,} \\ P_{IM} & \text{otherwise.} \end{cases}$$

maximum aggregation given by $P=\max(P_{PL}, P_{IM})$,
minimum aggregation given by $P=\min(P_{PL}, P_{IM})$ It should be noted that also any aggregation combination of the above aggregation approaches can be employed according to embodiments. Furthermore, the combination of the path-loss and the interpolation estimates may be reduced to include only the interpolation estimate for certain radio service information, such as BLER/BER, RSRQ, CSI, etc.

For such a service information the weight of the interpolation estimate is set to 1, i.e., $w_{IM}=1$, while the weight of the path-loss estimate is set to 0, i.e. $w_{PL}=0$, in the weighted combination=$w_{PL}P_{PL}+w_{IM}P_{IM}$ When a set of RSI has been obtained by a network access node 100, 300, 700, e.g. using the weighted-aggregation estimation method described above, the set of RSI may be exchanged with one or more of its neighbouring nodes as will now be described with reference to FIG. 4.

Figure 4:
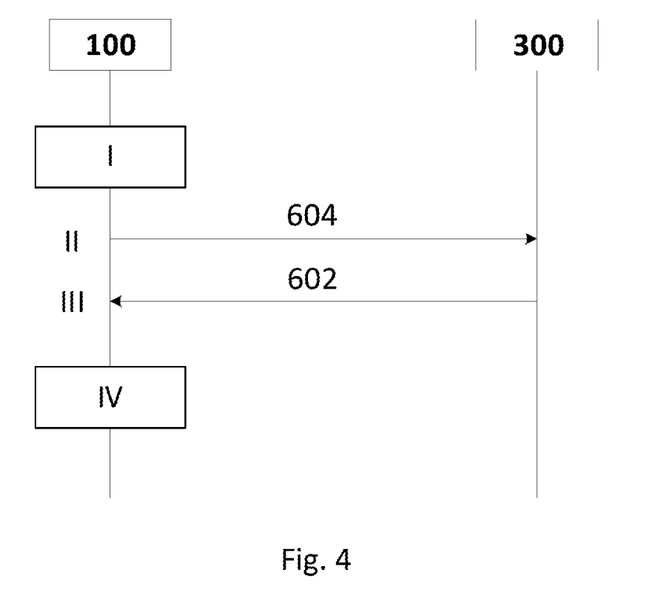
FIG. 4 shows signalling between a first network access node and a second network access node according to an embodiment.

FIG. 4 shows the exchange of sets of RSI between the first network access node 100 and the second network access node 300 according to an embodiment. In step I in FIG. 4, the first network access node 100 obtains a set of first RSI for a set of first position information in a service area 502. As previously described, each first RSI of the set of first RSI comprises a first RSI estimate, a first estimate type indicating how the first RSI estimate was estimated, and a first radio service type defining the first RSI estimate. The information comprised in the first RSI will be further described below with reference to FIG. 5a). The obtaining of the set of first RSI in step I in FIG. 4 may be performed based on the previously described weighted-aggregation estimation method.

In order to acquire additional RSI from the service area 502, the first network access node 100 may request a set of second RSI for a set of second position information from the second network access node 300. Such a request is initiated by the first network access node 100 by generating a second control message 604 comprising a request for the set of second RSI for the set of second position information. The first network access node 100 further transmits the second control message 604 to the second network access node 300, as shown in step II in FIG. 4. In response to the transmission of the second control message 604, the first network access node 100 receives a first control message 602 comprising the set of second RSI for the set of second position information, as shown in step III in FIG. 4.

In the embodiment shown in FIG. 4, the second network access node 300 transmits the first control message 602 upon a request from the first network access node 100. However, the second network access node 300 may in embodiments instead transmit a first control message 602 to the first network access node 100 without a request from the first network access node 100. The second network access node 300 may hence transmit a first control message 602 to the first network access node 100 at any time, but would typically perform the transmission of a first control message 602 either periodically or when an event is triggered. In the latter case, a first control message 602 may e.g. be transmitted when the second network access node 300 has been reconfigured, a new second RSI is available to the second network access node 300, or an existing second RSI has been updated. Furthermore, the transmission of a first control message 602 may be triggered by the second network access node 300 receiving an event associated with a specific position from one or more neighbouring network access nodes. Upon reception of such an event message, the second network access node 300 determines the effect of the event on the position and responds back to its neighbouring network access nodes with the determined second RSI. Possible events may include but are not restricted to:

Neighbourhood discovery for a non-empty set of positions;

Addition of a new neighbouring network access node or activation of an existing neighbouring network access node;

Removal of a neighbouring network access node or deactivation of a neighbouring network access node; and Service-based seamless handover preparation.

The first control message 602 received by the first network access node 100 in step III in FIG. 4 comprises the set of second RSI for the set of second position information. As previously described, each second RSI of the set of second RSI comprises a second RSI estimate, a second estimate type indicating how the second estimate was estimated, and a second radio service type defining the second RSI estimate. The information comprised in the second RSI will be further described below with reference to FIG. 5b).

In step IV in FIG. 4, the first network access node 100 determines a coverage service map based on the set of first RSI, the set of first position information, the set of second RSI, and the set of second position information. The coverage service map is a set of position information in the service area where the first network access node 100 can serve client devices with a service having specific quality requirements. In one example the coverage service map may be determined by comparing the set of first RSI with a service threshold which defines the quality requirements of the service. In another example the coverage service map may be determined by a comparison of the set of first RSI with the set of second RSI for a set of common positions, where the set of common positions corresponds to positions common to both the set of first position information and the set of second position information. The set of common positions may hence comprise a subset of the set of positions corresponding to the intersection of the set of first position information of the first network access node 100 and the set of second position information of the second network access node 300. Based on the comparison, the first network access node 100 determines the coverage service map to comprise the set of positions where the first RSI is higher than the second RSI. In other words, the coverage map of the first network access node 100 is determined such that it comprises the set of positions where the first network access node 100 can provide the best service performance. In an embodiment the coverage service map is determined by the combination of the two example comparisons mentioned above.

In embodiments described so far, the first network access node 100 has received second RSI from one second network access node 300 only. However, in embodiments, the first network access node 100 may receive a set of second RSI from several neighbouring network access nodes and determine its coverage service map based on all the received sets of second RSI. In such cases, the first network access node 100 may perform a comparison of its own RSI for every position where the first network access node 100 can provide service coverage with one or more second RSI for that position provided from neighbouring network access nodes.

According to embodiments, the first network access node 100 may further consider a service threshold value when determining the coverage service map. The service threshold value may be associated with performance indicators for a set of positions and used to divide the set of positions into a first subset of positions where coverage can be provided and a second subset of positions where coverage cannot be provided. Different set of positions may have different service threshold values. By exchanging the service threshold value between neighbouring network access nodes, the service threshold value may be collaboratively determined such that outage areas and coverage holes are minimized.

In embodiments where the first network access node 100 consider a service threshold value when determining the coverage service map, the first network access node 100 may determine a subset of the set of first RSI for a subset of the set of first position information based on the service threshold value. The first network access node 100 further limits the subset of the set of first RSI based on a comparison of the subset of the set of first RSI and the set of second RSI at the intersection of the subset of the set of first position information and the set of second position information. The first network access node 100 may e.g. limit the subset of the set of first RSI based on a comparison of first estimate types of the subset of the set of first RSI and second estimate type of the set of second RSI at the intersection of the subset of the set of first position information and the set of second position information. Based on the limited subset of the set of first RSI, the first network access node 100 determines the coverage service map. In this way, the resulting coverage map of the first network access node 100 will only comprise a set of positions where the first RSI is both higher than the second RSI and higher than the service threshold value.

FIG. 5a) and b) shows information elements comprised in a first RSI and a second RSI, respectively, according to embodiments. Each first RSI comprises three mandatory information elements, a first RSI estimate, a first estimate type indicating how the first RSI estimate was estimated, and a first radio service type defining the first RSI estimate, as shown in FIG. 5a). The first RSI estimate indicates a first RSI value correspond to a measured value, predicted value or an estimated value such as the average, the median, the quartiles, the min and max values and other statistical measures of location of the radio signal.

The first estimate type which indicates how the first RSI estimate was estimated may indicate any of:
  a) estimated by the first network access node 100 based on a set of first radio signal information from a set of first client devices 412a, 412b, . . . , 412n in the service area 502, wherein the size of the set of first radio signal information is higher than a first upper threshold value;
  b) predicted by the first network access node 100 based on a set of first radio signal information from a set of first client devices 412a, 412b, . . . , 412n in the service area 502, wherein the size of the set of first radio signal information is lower than a first lower threshold value; and
  c) measured by the first network access node 100 based on a set of first radio signal information from a set of first client devices 412a, 412b, . . . , 412n in the service area 502, wherein the size of the set of first radio signal information is lower than the first upper threshold value and higher than the first lower threshold value.

Furthermore, the first radio service type may indicate the type of the first RSI and may be a radio signal related type, such as e.g. RSS or RSRP, or a service performance related type, such as e.g. BLER, BER.

Figure 5:
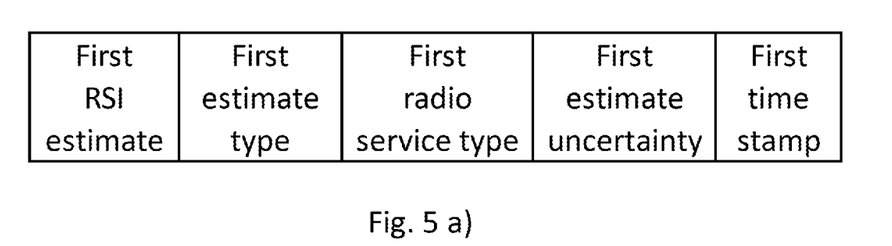

In a similar way as for the first RSI, each second RSI comprises three mandatory information elements, a second RSI estimate, a second estimate type indicating how the second estimate was estimated, and a second radio service type defining the second RSI estimate, as shown in FIG. 5 b). The second RSI estimate may indicate a second RSI value correspond to a measured value, predicted value or an estimated value such as the average, the median, the quartiles, the min and max values and other statistical measures of location of the radio signal.

The second estimate type which indicates how the second estimate was estimated may indicate any of:
  d) estimated by the second network access node 300 based on a set of second radio signal information from a set of second client devices 422a, 422b, . . . , 422n in the service area 502, wherein the size of the set of second radio signal information is higher than a second upper threshold value;
  e) predicted by the second network access node 300 based on a set of first radio signal information from a set of second client devices 422a, 422b, . . . , 422n in the service area 502, wherein the size of the set of second radio signal information is lower than a second lower threshold value; and
  f) measured by the second network access node 300 based on a set of first radio signal information from a set of second client devices 422a, 422b, . . . , 422n in the service area 502, wherein the size of the set of second radio signal information is lower than the second upper threshold value and higher than the second lower threshold value.

Furthermore, the second radio service type may indicate the type of the second RSI and may be a radio signal related type, such as e.g. RSS or RSRP, or a service performance related type, such as e.g. BLER, BER.

As shown in FIG. 5 a) and b) the first RSI and the second RSI may further comprise information about an uncertainty of the RSI estimate. Thus, each first RSI may further comprises a first estimate uncertainty indicating a measure of spread of the first RSI estimate, and each second RSI further comprises a second estimate uncertainty indicating a measure of spread of the second RSI estimate. For example, the first estimate uncertainty and the second estimate uncertainty may correspond to a measure of discrepancy or error, prediction error, or estimate uncertainty such as the confidence interval at different percentages, the variation/deviation (2nd moment), the 3rd and 4th moments, and other statistical measures of spread of the radio signal.

Moreover, the first RSI and the second RSI may further comprise information about time. In such embodiments, each first RSI further comprises a first timestamp indicating a first time period when the first RSI is valid, and each second RSI further comprises a second timestamp indicating a second time period when the second RSI is valid, as shown in FIG. 5a) and b). To capture the differences in the first RSI and the second RSI for different time periods a large amount of client device measurements needs to be collected and processed. The time periods may be identified by means of clustering algorithms that cluster the client device measurements over time. In addition, the time periods that clusters the measurements over time may be different for different network access nodes implying spatial clustering. This requires a clustering algorithm for finding density-based clusters in temporal and spatial data. Such a clustering algorithm would result into a representative set of data for each position and time period, hence allowing a scalable coverage service map to be determined.

According to an example client device measurement collection and processing is performed independently for different time periods of a day using the following method:
  Record a triple ($t_j$, $pos_i$, $rss_i$) where $rss_i$ is the received radio signal strength $P_{j,i}$ of the ith measurement at time $t_j$ at position $pos_i$;
  Process the recorded triples statistically to generate a triple ($T_t$, $pos_c$, $s_{t,c}(rss)$) where $s_{t,c}(rss)$ is a statistical measure such as the average received radio signal strength, $s_{t,c}(rss) = \overline{P}_{t,c}$ at position $pos_t$ at time period $T_t$; and
  Repeat the client device measurement collection for a position $pos_t$ based on numerous time instances $t_j$ within the time period $T_t$ until the deviation of the average value of $P_{t,c}$ deviation for the time period $T_t$ is below an acceptable threshold value or within a certain confidence interval.

Further details related to the signalling between the first network access node 100, the second network access node 300, and the third network access node 700 will now be described with reference to FIG. 6. In step I in FIG. 6, the first network access node 100 transmits a second control message 604 to the second network access node 300. As previously described, the second control message 604 comprise a request for a set of second RSI for the set of second position information. However, the second control message 604 may comprise additional information, such as e.g. a second RSI threshold value or a request for an identity of a third network access node 700. A second RSI threshold value may be included in the second control message 604 to request a set of second RSI, which have a RSI value higher than the second RSI threshold value, from the second network access node 300. On the other hand, a request for an identity of a third network access node 700 may be included in the second control message 604 to discover neighbouring network access nodes which covers a specific set of second position information.

When a second RSI threshold value should be comprised in the second control message 604, the first network access node 100 firstly determines the second RSI threshold value. The second RSI threshold value is associated with a set of second RSI for a set of second position information. The first network access node 100 may determine the second RSI threshold value either based on a RSI threshold value defined by a central network node or jointly determined by a set of neighbouring network access nodes. The first network access node 100 includes the determined second RSI threshold value in a second control message 604 and transmits the second control message 604 to the second network access node 300. Hence, the second control message 604 transmitted in step I in FIG. 6 may further comprise a second RSI threshold value. In such cases, the second network access node 300 obtains the second RSI threshold value from the second control message 604 and prepares the first control message 602 based on the obtain the second RSI threshold value. The first control message 602 transmitted in step II in FIG. 6 will hence comprise a set of second RSI for the set of second position information, where the second RSIs in the set of second RSI have a RSI value higher than the second RSI threshold value.

In embodiments where the second control message 604 further comprises a request for an identity of a third network access node 700, the request may be for an identity of a third network access node 700 having a set of additional second RSI for the set of second position information. In response to the transmission of such a second control message 604, the first network access node 100 may receive a first control message 602 comprising an identity of a third network access node 700 having a set of additional second RSI for the set of second position information. Hence, the first control message 602 transmitted in step II in FIG. 6 may in embodiments comprise an identity of a third network access node 700 having a set of additional second RSI for the set of second position information. The first network access node 100 may use the received identity of the third network access node 700 to contact the third network access node 700 and request the set of additional second RSI for the set of second position information. The first network access node 100 may transmit such a request in an additional second control message 604 to the third network access node 700 using the identity of the third network access node 700, as shown in step III in FIG. 6. Thus, in this case the additional second control message 604 will comprise a request for a set of additional second RSI for the set of second position information. In response to such an additional second control message 604, the first network access node 100 may receive an additional first control message 602 from the third network access node 700, as shown in step IV in FIG. 6. The additional first control message 602 comprises the set of additional second RSI for the set of second position information.

Figure 6:
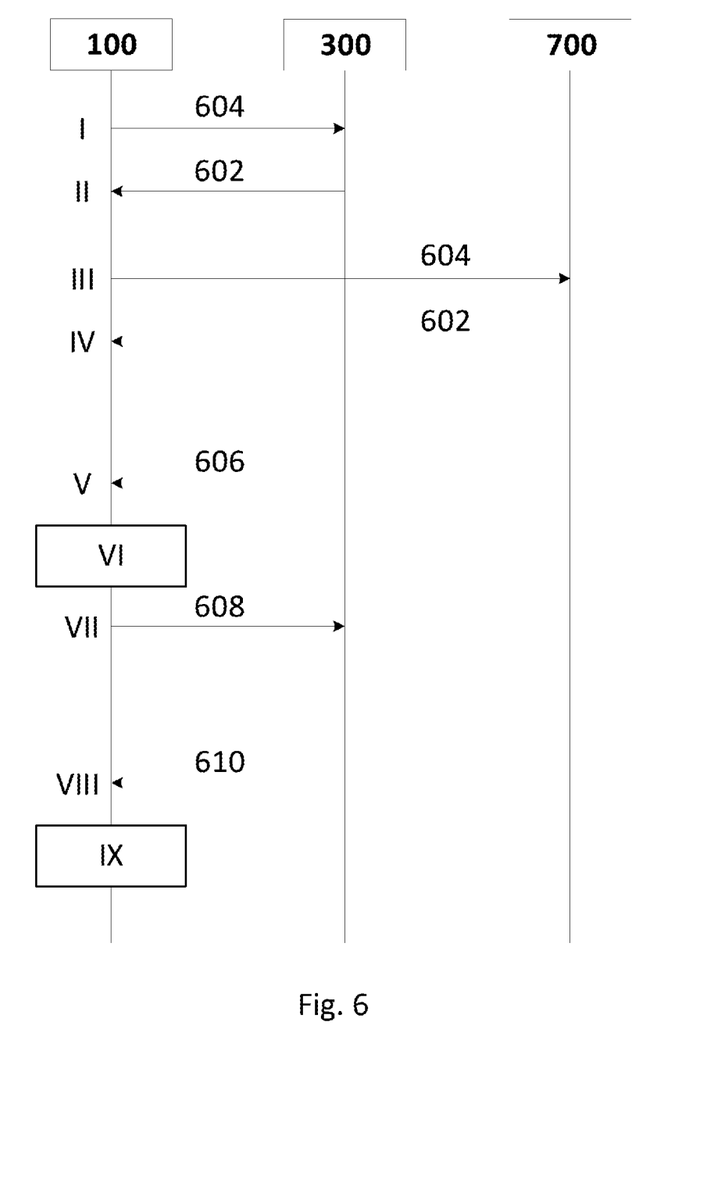
FIG. 6 shows signalling between a first network access node, a second network access node, and a third network access node according to an embodiment.

Moreover, the second network access node 300 may request and receive RSI from the first network access node 100, as shown in step V-VII in FIG. 6. In step V in FIG. 6, the first network access node 100 receives a third control message 606 from the second network access node 300. The third control message 606 comprises a request for a set of first RSI for a set of first position information. Based on the received third control message 606, the first network access node 100 generates a fourth control message 608 comprising the set of first RSI for the set of first position information in step VI in FIG. 6. In step VII in FIG. 6, the first network access node 100 transmits the fourth control message 608 to the second network access node 300 in response to the reception of the third control message 606.

In the same way as for the second control message 604, the third control message 606 may further comprises a first RSI threshold value associated with the set of first RSI for the set of first position information. When the third control message 606 further comprises such a first RSI threshold value the first network access node 100 will generate the fourth control message 608 comprising the set of first RSI for the set of first position information in step VI in FIG. 6, based on the first RSI threshold value.

Furthermore, in embodiments, the first network access node 100 may receive a fifth control message 610 from the second network access node 300, as shown in step VIII in FIG. 6. The fifth control message 610 may indicates a change in power operation mode of the second network access node 300. Based on the received fifth control message 610, the first network access node 100 may in step IX determine an updated coverage service map.

The client device 412n, 422n herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 100, 300, 700 herein may also be denoted as a radio network access node, an access network access node, an access point, or a base station, e.g. a Radio Base Station (RBS), which in some networks may be referred to as transmitter, "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 412n, 422n and the network access node 100, 300, 700 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the client device 412n, 422n and the network access node 100, 300, 700 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A first network access node for a wireless communication system, the first network access node comprising:
a processor configured to:
obtain a set of first radio service information (RSI) for a set of first position information in a service area, the set of first RSI including one or more first RSI, wherein each respective first RSI of the set of first RSI comprises a respective first RSI estimate, a respective first estimate type indicating how the first respective RSI estimate was estimated, and a respective first radio service type defining the respective first RSI estimate;
receive a first control message from a second network access node, wherein the first control message comprises a set of second RSI for a set of second position information in the service area, the set of second RSI including one or more second RSI, wherein each respective second RSI of the set of second RSI comprises a respective second RSI estimate, a respective second estimate type indicating how the respective second RSI estimate was estimated, and a respective second radio service type defining the respective second RSI estimate; and
determine a coverage service map based on the set of first RSI, the set of first position information, the set of second RSI, and the set of second position information;
wherein each respective first estimate type indicates that the corresponding respective first RSI estimate was estimated, predicted, or measured, and
wherein each respective second estimate type indicates that the corresponding respective second RSI estimate was estimated, predicted, or measured.

2. The first network access node according to claim 1, wherein the processor is further configured to:
obtain a set of first radio signal information for the service area;
determine a set of first path-loss estimates for the set of first position information based on the set of first radio signal information;
determine a set of first interpolation-based estimates for the set of first position information based on the set of first radio signal information; and
obtain the set of first RSI for the set of first position information by determining the set of first RSI based on a weighted aggregation of the set of first path-loss estimates and the set of first interpolation-based estimates.

3. The first network access node according to claim 2, wherein the processor is configured to determine the set of first RSI based on at least one of:
a weighted sum of the set of first path-loss estimates and the set of first interpolation-based estimates;
a maximum aggregation of the set of first path-loss estimates and the set of first interpolation-based estimates;
a minimum aggregation of the set of first path-loss estimates and the set of first interpolation-based estimates; and
a priority aggregation of the set of first path-loss estimates and the set of first interpolation-based estimates based on priorities associated to line-of-sight or no line-of-sight.

4. The first network access node according to claim 1, wherein the processor is further configured to:
determine a subset of the set of first RSI for a subset of the set of first position information based on a service threshold value;
limit the subset of the set of first RSI based on a comparison of the subset of the set of first RSI and the set of second RSI at an intersection of the subset of the set of first position information and the set of second position information; and
determine the coverage service map based on the limited subset of the set of first RSI.

5. The first network access node according to claim 1, wherein the respective first estimate type indicates any of:
a) that the respective first RSI estimate was estimated by the first network access node based on a set of first radio signal information from a set of first client devices in the service area, wherein the size of the set of first radio signal information is higher than a first upper threshold value;

b) that the respective first RSI estimate was predicted by the first network access node based on the set of first radio signal information from the set of first client devices in the service area, wherein the size of the set of first radio signal information is lower than a first lower threshold value; and c) that the respective first RSI estimate was measured by the first network access node based on the set of first radio signal information from the set of first client devices in the service area, wherein the size of the set of first radio signal information is lower than the first upper threshold value and higher than the first lower threshold value.

6. The first network access node according to claim 1, wherein the respective second estimate type indicates any of:

d) that the respective second RSI estimate was estimated by the second network access node based on a set of second radio signal information from a set of second client devices in the service area, wherein the size of the set of second radio signal information is higher than a second upper threshold value;

e) that the respective second RSI estimate was predicted by the second network access node based on the set of first radio signal information from the set of second client devices in the service area, wherein the size of the set of second radio signal information is lower than a second lower threshold value; and f) that the respective second RSI estimate was measured by the second network access node based on the set of first radio signal information from the set of second client devices in the service area, wherein the size of the set of second radio signal information is lower than the second upper threshold value and higher than the second lower threshold value.

7. The first network access node according to claim 1, wherein each respective first RSI further comprises a respective first estimate uncertainty indicating a measure of spread of the respective first RSI estimate, and wherein each respective second RSI further comprises a respective second estimate uncertainty indicating a measure of spread of the respective second RSI estimate.

8. The first network access node according to claim 1, wherein the processor is further configured to:

generate a second control message comprising a request for the set of second RSI for the set of second position information;

transmit the second control message to the second network access node;

receive the first control message comprising the set of second RSI for the set of second position information in response to the transmission of the second control message.

9. The first network access node according to claim 8, wherein the processor is further configured to:

determine a second RSI threshold value associated with the set of second RSI for the set of second position information, wherein the second control message further comprises the second RSI threshold value.

10. The first network access node according to claim 8, wherein the first control message further comprises an identity of a third network access node, and wherein the processor is further configured to:

transmit an additional second control message to the third network access node using the identity of the third network access node, wherein the additional second control message comprises a request for a set of additional second RSI for the set of second position information;

receive an additional first control message from the third network access node, wherein the additional first control message comprises the set of additional second RSI for the set of second position information.

11. The first network access node according to claim 1, wherein the processor is configured to:

receive a third control message from the second network access node, wherein the third control message comprises a request for the set of first RSI for the set of first position information;

generate a fourth control message comprising the set of first RSI for the set of first position information; and transmit the fourth control message to the second network access node in response to the reception of the third control message.

12. The first network access node according to claim 11, wherein the third control message further comprises a first RSI threshold value associated with the set of first RSI for the set of first position information, and wherein the processor is further configured to generate the fourth control message comprising the set of first RSI for the set of first position information based on the first RSI threshold value.

13. The first network access node according to claim 11, wherein the processor is further configured to:

receive a fifth control message from the second network access node, wherein the fifth control message indicates a change in power operation mode of the second network access node; and determine an updated coverage service map based on the fifth control message.

14. The first network access node according to claim 11, wherein the processor is further configured to allocate radio resources in the service area based on the coverage service map.

15. A method for execution by a first network access node, the method comprising:

obtaining a set of first radio service information (RSI) for a set of first position information in a service area, the set of first RSI including one or more first RSI, wherein each respective first RSI of the set of first RSI comprises a respective first RSI estimate, a respective first estimate type indicating how the respective first RSI estimate was estimated, and a respective first radio service type defining the first respective RSI estimate;

receiving a first control message from a second network access node, wherein the first control message comprises a set of second RSI for a set of second position information in the service area, the set of second RSI including one or more second RSI, wherein each respective second RSI of the set of second RSI comprises a respective second RSI estimate, a respective second estimate type indicating how the respective second estimate was estimated, and a respective second radio service type defining the respective second RSI estimate;

determining a coverage service map based on the set of first RSI, the set of first position information, the set of second RSI, and the set of second position information;

wherein each respective first estimate type indicates that the corresponding respective first RSI estimate was estimated, predicted, or measured, and wherein each respective second estimate type indicates that the corresponding second RSI estimate was estimated, predicted, or measured.

16. A non-transitory computer readable medium having stored thereon program code comprising processor executable instructions that, when executed by a processor, cause the processor to execute the method according to claim 15.

* * * * *